United States Patent
Menon et al.

(10) Patent No.: US 9,457,544 B1
(45) Date of Patent: Oct. 4, 2016

(54) DISPLAY STACK FABRICATION

(71) Applicant: Amazon Technologies, Inc., Reno, NV (US)

(72) Inventors: Anoop Menon, Capitola, CA (US); Weihsin Hou, Fremont, CA (US); Chin Siong Khor, Singapore (SG); Yean Chan Woon, Singapore (SG)

(73) Assignee: Amazon Technologies, Inc., Seattle, WA (US)

( * ) Notice: Subject to any disclaimer, the term of this patent is extended or adjusted under 35 U.S.C. 154(b) by 212 days.

(21) Appl. No.: 14/104,791

(22) Filed: Dec. 12, 2013

(51) Int. Cl.
*B32B 27/04* (2006.01)

(52) U.S. Cl.
CPC ..................... *B32B 27/04* (2013.01)

(58) Field of Classification Search
CPC .............. B32B 37/1284; B32B 37/24; B32B 38/0008; B32B 7/12; H05K 7/1427
See application file for complete search history.

(56) References Cited

U.S. PATENT DOCUMENTS

| | | | | |
|---|---|---|---|---|
| 2002/0101399 A1* | 8/2002 | Kubo | ............... | G02F 1/13338 345/104 |
| 2003/0179563 A1* | 9/2003 | Masuda | ............ | G02F 1/133502 362/23.15 |
| 2011/0177261 A1* | 7/2011 | Ishii | .................. | G02F 1/133308 428/1.5 |

\* cited by examiner

*Primary Examiner* — Daniel McNally
(74) *Attorney, Agent, or Firm* — Lee & Hayes, PLLC (57) ABSTRACT

In some implementations, a process includes forming a layer of a liquid optically clear adhesive (LOCA) on a surface of a first substrate. Additionally, the LOCA can be contacted with a surface of a second substrate. The LOCA can then be exposed to Ultraviolet (UV) radiation. After exposing the LOCA to UV radiation, additional substrates can be coupled to the first substrate, the second substrate, or both to form a display stack. In an implementation, the total energy/unit area for the UV radiation applied to the LOCA can be no greater than 25,000 kJ/cm².

20 Claims, 3 Drawing Sheets

FIG. 3

DISPLAY STACK FABRICATION

BACKGROUND

Electronic displays (also referred to herein as "displays") are found in numerous types of electronic devices such as electronic book ("eBook") readers, mobile telephones, smart phones, portable media players, tablet computers, wearable computers, laptop computers, netbooks, desktop computers, televisions, appliances, home electronics, automotive electronics, augmented reality devices, and so forth. Electronic displays may present various types of information, such as user interfaces, device operational status, digital content items, and the like, depending on the kind and purpose of the electronic device that includes the electronic display. The appearance and quality of images produced on a display can affect the user's experience with the electronic device and the content presented thereon. In some cases, the processes used to assemble an electronic display and/or the materials included in the electronic display may affect the appearance and quality of content presented on the electronic display.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes, in part, electronic devices that include electronic displays that present content and other information. The electronic displays can include a display stack that has a number of layers, including a number of substrates and one or more adhesive layers to bond the substrates. For example, a display stack can include a display component that displays content. Additionally, a number of additional substrates can be stacked on top of the display component. To illustrate, a display stack can include a touch sensor that generates signals in response to an input device contacting the display stack. In some cases, a substrate of the display stack can include a cover layer located at the top of the display stack to protect other substrates of the display stack. The cover layer can include antiglare properties, antireflective properties, anti-fingerprint properties, anti-cracking properties, and the like. The display stack can also include a lighting component, such as a front-side lighting component or a backlight lighting component to provide light to view the content displayed on the display component.

At least a portion of the substrates of the display stack may be coupled together using one or more adhesives. In some cases, the physical properties and the optical properties of the one or more adhesives can affect the quality of the appearance of the content shown on the display. For example, an adhesive included in a display stack can be optically clear or substantially optically clear to provide a clear view of content displayed on a display component of the display stack. Additionally, an adhesive included in a display stack can have a refractive index that reduces any reflection of light within the display stack.

In some cases, the curing of one or more adhesives utilized to form the display stack can result in defects to the display stack. For example, during the curing process, one or more substrates of the display stack can be exposed to temperatures that cause warping of the one or more substrates. In another example, the curing of some portions of the adhesive can be limited during the formation of the display stack, which can result in decreased adhesion between substrates of the display stack. Defects present in the display stack due to adhesives used to couple layers of the display stack can affect the quality of the appearance of content displayed by the display stack, and in some instances, decrease user satisfaction with electronic devices including such display stacks.

Accordingly, in implementations described herein, a first adhesive coupling a first substrate of a display stack with a second substrate of the display stack can be subjected to a curing operation before coupling a third substrate to the second substrate with a second adhesive. In one example, a liquid optically clear adhesive (LOCA) can be applied to a surface of the first substrate and/or a surface of the second substrate to couple the first substrate to the second substrate. The LOCA can then be subjected to a curing operation, such as exposing the LOCA to ultraviolet (UV) radiation. The curing operation can be performed to partially cure the LOCA. In an implementation, the first substrate can include a display component of the display stack and the second substrate can include a front light component of the display stack. Additionally, a second adhesive can be applied to a third substrate, such as a cover layer component of the display stack. The second adhesive can couple the third substrate with the second substrate after the first adhesive has been subjected to the curing operation.

By at least partially curing the first adhesive before coupling the second substrate to the third substrate, the amount of energy used to cure the first adhesive is reduced. In one example, the third substrate can include a material that blocks or impedes an amount of UV radiation from passing through the third substrate. In another example, the third substrate can be coupled to a material that blocks an amount of UV radiation from passing through the third substrate. To illustrate, a particular adhesive used to couple the third substrate to the display stack can include a UV filtering material that blocks UV radiation from passing through a layer of the particular adhesive.

Accordingly, coupling the third substrate to the second substrate before curing the first adhesive can increase the amount of energy consumed to cure the first adhesive due to the material of the third substrate that blocks UV radiation from reaching the first adhesive. By reducing the amount of energy applied to cure the first adhesive, the substrates of the display stack can be exposed to lower temperatures than with conventional processes, which can reduce warping of the substrates. Furthermore, by at least partially curing the first adhesive before any UV blocking materials are coupled to the first substrate and/or the second substrate, the exposure of the first adhesive to UV radiation can increase and thereby improve adhesion strength. In other situations, a display stack can include a bezel layer that blocks UV radiation from curing edges of a layer of the first adhesive of the display stack. Thus, by curing the first adhesive before adding the bezel layer to the display stack, the adhesion strength on the edges of the display stack is also improved, which can reduce delamination of one or more layers of the display stack.

Figure 1:
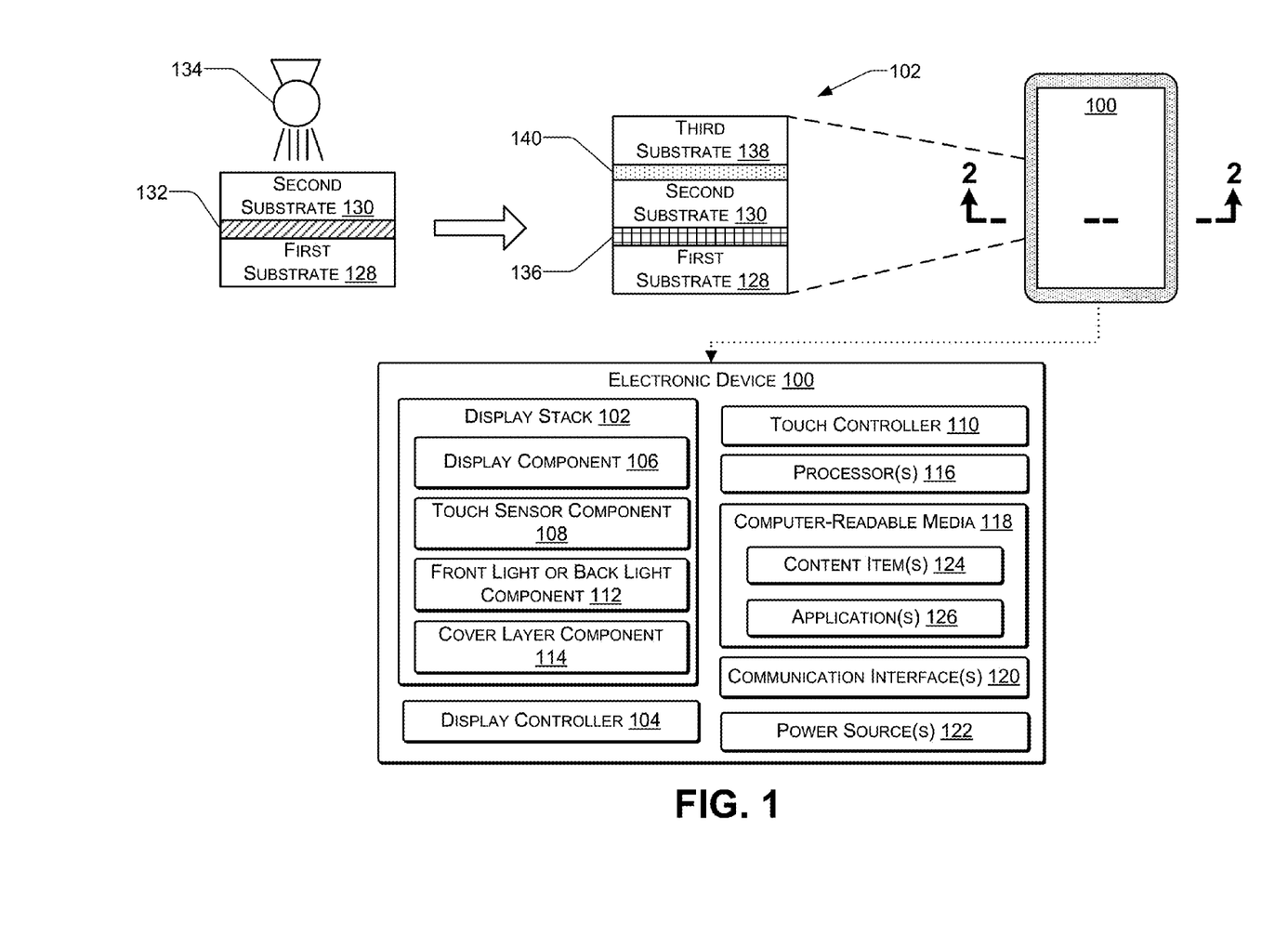
FIG. 1 illustrates an example electronic device that includes a display stack that is produced by partially curing a first adhesive coupling a first substrate and a second substrate, and then coupling a third substrate to the second substrate with a second adhesive.

FIG. 1 illustrates an example electronic device 100 that includes a display stack 102 that is formed by partially curing a first adhesive coupling a first substrate and a second substrate and then coupling a third substrate to the second substrate with a second adhesive. The electronic device 100 can include any type of electronic device having a display. For instance, the electronic device 100 can be a mobile electronic device, such as an electronic book reader, a tablet computing device, a laptop computer, a smart phone or other multifunction communication device, a portable digital assistant, a media player, a wearable computing device, an automotive display, combinations thereof, and the like. Alternatively, the electronic device 100 may be a non-mobile electronic device, such as a computer display, a desktop computing device, a television, a household appliance, industrial equipment, combinations thereof, and so forth. In addition, while FIG. 1 illustrates several example components of the electronic device 100, it is to be appreciated that the device 100 can also include other components, such as an operating system, system busses, input/output components, and the like. Further, in other examples, such as in the case of a television or computer monitor, the electronic device 100 can include a subset of the components shown.

Regardless of the specific implementation of the electronic device 100, the electronic device 100 includes the display stack 102 and a corresponding display controller 104. The display stack 102 can include a display component 106 that can display content via one or more image producing technologies. For example, the display component 106 can include a reflective display, such as an electronic paper display, a reflective liquid crystal display (LCD), or the like. Electronic paper displays represent an array of display technologies that can mimic the look of ordinary ink on paper. In contrast to backlit displays, electronic paper displays typically reflect light, much as ordinary paper does. In addition, electronic paper displays can be bi-stable, meaning that these displays are capable of holding text or other rendered images even when very little or no power is supplied to the display. Some examples of the display component 106 that can be used with the implementations described herein include bi-stable LCDs, micro electromechanical system (MEMS) displays, such as interferometric modulator displays, cholesteric displays, electrophoretic displays, electrofluidic pixel displays, electrowetting displays, photonic ink displays, gyricon displays, and the like. In other implementations, or for other types of electronic devices 100, the display component 106 can include an active display such as a liquid crystal display, a plasma display, a light emitting diode display, an organic light emitting diode display, and so forth. Accordingly, implementations herein are not limited to any particular display technology.

In one implementation, the display component 106 includes an electrophoretic display that moves particles between different positions to achieve different color shades. For instance, in a pixel that is free from a color filter, the pixel can be configured to produce white when the particles within this pixel are located at the front (i.e., viewing) side of the display component 106. When situated in this manner, the particles reflect incident light, thus giving the appearance of a white pixel. Conversely, when the particles are pushed near the rear of the display component 106, the display component 106 absorbs the incident light and, hence, causes the pixel to appear black to a viewing user. In addition, the particles can be situated at varying locations between the front and rear sides of the display component 106 to produce varying shades of gray. Furthermore, as used herein, a "white" pixel can include any shade of white or off white, while a "black" pixel can include any shade of black.

In another implementation, the display component 106 can include an electrophoretic display that includes oppositely charged light and dark particles. In these implementations, to create white, the display controller 104 can move light particles to the front side of the display component 106 by creating a corresponding charge at an electrode near the front of the display component 106 and moves the dark particles to the back of the display component 106 by creating a corresponding charge at an electrode near the back. In order to create black, meanwhile, the display controller 104 changes the polarities and moves the dark particles to the front of the display component 106 and the light particles to the back of the display component 106. Furthermore, to create varying shades of gray, the display controller 104 can utilize different arrays of both light and dark particles. In some cases, the particles can be contained in individual transparent capsules. In a particular example, the capsules can have a diameter included in a range of 35 micrometers to 45 micrometers. The capsules can be suspended in a fluid, such as a liquid polymer, between a transparent upper electrode grid layer and a lower electrode grid layer separated by a gap of approximately 50 micrometers to 200 micrometers.

In still another implementation, the display component 106 can comprise an electrowetting display that employs an applied voltage to change the surface tension of a liquid in relation to a surface. For instance, by applying a voltage to a hydrophobic surface, the wetting properties of the surface can be modified so that the surface becomes increasingly hydrophilic. As one example of an electrowetting display, the modification of the surface tension acts as an optical switch by contracting a colored oil film when a voltage is applied to individual pixels of the display. When the voltage is absent, the colored oil forms a continuous film within a pixel, and the color may thus be visible to a user of the display. On the other hand, when the voltage is applied to the pixel, the colored oil is displaced and the pixel becomes transparent. When multiple pixels of the display are independently activated, the display can present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video content. In addition, the lower power consumption of electrowetting displays in comparison to conventional LCD displays makes the technology suitable for displaying content on portable devices that rely on battery power.

While several different examples have been given, the reflective displays described herein can comprise any other type of electronic-paper technology or reflective-display technology. In addition, while some of the examples described above are discussed as rendering black, white, and varying shades of gray, the described techniques can also apply to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, the display component 106 may represent a backlit display, examples of which are mentioned above.

In addition to including the display component 106, the electronic device 100 can include a touch sensor component 108 and a touch controller 110. In some instances, at least one touch sensor component 108 resides with, or is stacked on, the display component 106 to form a touch-sensitive display (e.g., an electronic paper touch-sensitive display). Thus, the display stack 102 can be capable of both accepting user touch input and rendering content in response to or corresponding to the touch input. As several examples, the touch sensor component 108 can include a capacitive touch sensor, a force sensitive resistance (FSR) sensor, an interpolating force sensitive resistance (IFSR) sensor, or any other type of touch sensor. In some instances, the touch sensor component 108 is capable of detecting touches as well as determining an amount of pressure or force of these touches.

The electronic device 100 can also include a front light component 112 (which may alternatively be a backlight component in the case of a backlit display) for lighting the display stack 102. The front light component 112 can include a light guide portion and a light source (not shown in FIG. 1). The light guide portion can include a substrate including a transparent thermoplastic polymer. For example, the light guide portion can include an acrylic polymer. In one implementation, the light guide portion can include polymethylmethacrylate (PMMA). In a particular implementation, the light guide portion can include a substrate, a layer of lacquer and multiple grating elements formed in the layer of lacquer. The multiple grating elements can be configured to propagate light to illuminate the display component 106.

Furthermore, the amount of light emitted by the front light component 112 may vary. For instance, upon a user opening a cover (not shown in FIG. 1) of the electronic device 100, the light from the front light component 112 may gradually increase to its full illumination. In some instances, the electronic device 100 includes an ambient light sensor (not shown in FIG. 1) and the amount of illumination of the front light component 112 can be based at least in part on the amount of ambient light detected by the ambient light sensor. For example, the front light component 112 can be dimmer if the ambient light sensor detects relatively little ambient light, such as in a dark room; can be brighter if the ambient light sensor detects ambient light within a particular range; and can be dimmer or turned off if the ambient light sensor detects a relatively large amount of ambient light, such as direct sunlight.

In addition, the settings of the display component 106 can vary depending on whether the front light component 112 is on or off, or based on the amount of light provided by the front light component 112. For instance, the electronic device 100 can implement a larger default font or a greater contrast when the front light component 112 is off compared to when the front light component 112 is on. In some instances, the electronic device 100 maintains, when the front light component 112 is on, a contrast ratio for the display component 106 that is within a certain defined percentage of the contrast ratio when the front light component 112 is off.

In addition, the electronic device 100 can include a cover layer component 114. The cover layer component 114 can include a substantially transparent substrate or sheet having an outer layer that functions to reduce at least one of glare or reflection of ambient light incident on the electronic device 100. In some instances, the cover layer component 114 can include a film including a polyester, a polycarbonate, or both. In some instances, the film may be manufactured with additives such that the resulting film includes a hardness rating that is greater than a predefined threshold. In this way, the cover layer component 114 can be resistant to scratches caused by objects having a hardness rating less than the predefined threshold. In a particular example, the threshold hardness rating can include at least a hardness rating that is resistant to a 3h pencil. Without such scratch resistance, the electronic device 100 can be more easily scratched and a user may perceive the scratches from the light that is dispersed over the top of the reflective display. The cover layer component 114 may, in some instances, include a UV filter, a UV-absorbing dye, or the like, for protecting components in the display stack 102 from UV light incident on the electronic device 100. In still other examples, the cover layer component 114 may include a sheet of high-strength glass having an antiglare and/or antireflective coating.

In an implementation, the touch sensor component 108 can be disposed atop the display component 106. In some examples, the touch sensor component 108 can be formed on or integrated with the cover layer component 114. In other examples, the touch sensor component 108 may be a separate component in display stack 102. Additionally, the front light component 112 can be disposed atop or below the touch sensor component 108. In some instances, either the touch sensor component 108 or the front light component 112 is coupled to a top surface of the display component 106. In some instances, the cover layer component 114 can couple to another component or to the display component 106.

The electronic device 100 can include one or more hardware processors 116 and one or more computer-readable media 118, one or more communication interfaces 120 and one or more power sources 122. The communication interfaces 120 can support both wired and wireless connection to various networks, such as cellular networks, radio, WiFi networks, short range networks (e.g., Bluetooth®), infrared (IR), and so forth.

Depending on the configuration of the electronic device 100, the computer-readable media 118 (and other computer-readable media described throughout) is an example of computer storage media and can include volatile and non-volatile memory. Thus, the computer-readable media 118 can include, but is not limited to, RAM, ROM, EEPROM, flash memory, or other memory technology, or any other medium that can be used to store computer-readable instructions, programs, applications, media items, and/or data which can be accessed by the electronic device 100. In some examples, the computer-readable media is a tangible non-transitory computer-readable media.

The computer-readable media 118 can be used to store any number of functional components that are executable on the processor 116, as well as content items 124 and applications 126. Thus, the computer-readable media 118 can include an operating system and a storage database to store one or more of the content items 124, such as eBooks, audio books, songs, videos, still images, and the like. The computer-readable media 118 of the electronic device 100 can also store one or more content presentation applications to render some of the content items 124 on the electronic device 100 via the display component 106. These content presentation applications may be implemented as various applications 126 depending upon the content items 124 being rendered. For instance, a content presentation application can include an electronic book reader application for rendering textual electronic books. In other cases, the applications 126 can include an audio player for playing audio books or songs, a video player for playing video, and so forth.

In an illustrative implementation, the display stack 102 can be formed by combining a number of substrates. FIG. 1 illustrates an example schematic cross-section of the display stack 102 including a number of layers taken along line 2-2 of FIG. 1. For example, the display stack 102 can include a first substrate 128 and a second substrate 130. In some cases, the first substrate 128 can include the display component 106 and the second substrate 130 can include the front light component 112. The first substrate 128 and the second substrate 130 can be coupled with a first adhesive 132.

In an implementation, the first adhesive 132 can include a liquid optically clear adhesive (LOCA). In some implementations, an LOCA can have a transmittance of radiation of a specified wavelength, such as 550 nm, of at least about 95%, at least about 98%, at least about 99%, or at least about 99.5%. In a particular implementation, the first adhesive 132 can include a silicone-based LOCA. In another implementation, the first adhesive 132 can include a fluorine-based LOCA. In a further implementation, the first adhesive 132 can include an acrylic-based LOCA. In an illustrative implementation, the first adhesive 132 can include Loctite® 5192 from Henkel AG and Company of Dusseldorf, Germany.

In a particular implementation, the first adhesive 132 can include a LOCA that has a refractive index of no greater than about 1.45, no greater than about 1.43, or no greater than about 1.41. In another implementation, the first adhesive 132 can include a LOCA that has a refractive index of at least about 1.36, at least about 1.38, or at least about 1.40. In an illustrative implementation, the first adhesive 132 can include a LOCA having a refractive index included in a range of about 1.36 to about 1.51. In another illustrative implementation, the first adhesive 132 can include a LOCA having a refractive index included in a range of about 1.39 to about 1.45.

In an implementation, the first adhesive 132 can include a LOCA having a percent elongation at break of at least about 125%, at least about 160%, or at least about 200%. Additionally, the first adhesive 132 can include a LOCA having a percent elongation at break of no greater than about 300%, no greater than about 260%, or no greater than about 220%. In an illustrative implementation, the first adhesive 132 can include a LOCA having a percent elongation at break included in a range of about 125% to about 350%. In another illustrative implementation, the first adhesive 132 can include a LOCA having a percent elongation at break included in a range of about 130% to about 200%.

In other implementations, the first adhesive 132 can include a gel that is applied to a surface of the first substrate 128 or a surface of the second substrate 130. In some situations, the gel may be partially cured before being applied to the surface of the first substrate 128 or the surface of the second substrate 130. The gel can be applied to the surface of the first substrate 128 or the surface of the second substrate 130 using a lamination process.

After coupling the first substrate 128 with the second substrate 130 using the first adhesive 132, the first adhesive 132 can be subjected to a curing operation. In some cases, the first adhesive 132 can be a photo-curable adhesive that is cured when exposed to electromagnetic radiation. In one example, the first adhesive 132 can be cured when exposed to UV radiation via a source 134. In an implementation, the source 134 can include a UV lamp. In a particular implementation, the curing operation can include a partial curing operation for the first adhesive 132. To illustrate, performing the curing operation with respect to the first adhesive 132 can result in at least 50% of the first adhesive 132 being cured, at least 60% of the first adhesive 132 being cured, at least 70% of the first adhesive 132 being cured, or at least 80% of the first adhesive 132 being cured. In an illustrative implementation, curing of the first adhesive 132 can result in cross-linking of polymer chains of the first adhesive 132.

Performing a curing operation on the first adhesive 132, can change one or more physical properties of the first adhesive 132 to produce a modified first adhesive 136. For example, the modified first adhesive 136 can have a viscosity that is different from the viscosity of the first adhesive 132. In another example, the modified first adhesive 136 can have a molecular weight that is different from a molecular weight of the first adhesive 132. A change in the physical properties of the first adhesive 132 after being cured for a period of time can indicate an amount of curing that occurs from the first adhesive 132 to the modified first adhesive 136. To illustrate, 50% curing of the first adhesive 132 can be characterized by a particular viscosity and/or a particular molecular weight of the modified first adhesive 136, while 75% curing of the first adhesive can be characterized by an additional viscosity and/or an additional molecular weight of the modified first adhesive 136. In another illustration, upon substantially complete curing of the first adhesive 132 (e.g., at least 95% curing for the first adhesive), the modified first adhesive 136 can have yet another viscosity and/or another molecular weight.

After performing the curing operation with respect to the first adhesive 132, the second substrate 130 can be coupled to a third substrate 138 with a second adhesive 140. In an implementation, the third substrate 138 can include the cover layer component 114. In a particular implementation, the second adhesive 140 can include one or more of a tape or a gel. The second adhesive 140 can also include a 2-component adhesive. In some cases, the second adhesive 140 can include an acrylic-based adhesive. In other situations, the second adhesive 140 can include a silicone-based optically clear adhesive (OCA). In an illustrative implementation, the second adhesive 140 can include an acrylic-based OCA. In one example, the second adhesive 140 can include polymethylmethacrylate (PMMA).

In some instances, the second adhesive 140 can have a refractive index of at least 1.33, at least 1.37, or at least 1.41. Additionally, the second adhesive 140 can have a refractive index no greater than 1.56, no greater than 1.54, or no greater than 1.52. In an illustrative implementation, the second adhesive 140 can have a refractive index included in a range of 1.38 to 1.45. In an illustrative implementation, the second adhesive 140 can have a refractive index included in a range of 1.47 to 1.53.

Although, the illustrative implementation of FIG. 1 shows that the second adhesive 140 couples the second substrate 130 to the third substrate 138, multiple adhesives can be used to couple the second substrate 130 to the third substrate 138. In implementations where multiple adhesives are used to couple the second substrate 130 to the third substrate 138, one of the adhesives can include an additive, such as a dye, to block UV radiation from passing through a layer of the adhesive. In some cases, the additive can block at least 85% of UV radiation from passing through the layer of the adhesive, at least 90% of UV radiation from passing through the layer of the adhesive, or at least 95% of UV radiation from passing through the layer of the adhesive. In an illustrative example, when multiple adhesives are used to couple the second substrate 130 with the third substrate 138 one of the adhesives can include ARclear® 8932EE from Adhesives Research, Inc. of Glen Rock, Pa., while another one of the adhesives can include EA122CC or EA122DD from New Tac Kasei Co, Ltd. of Shikokuchuo, Ehime, Japan. Furthermore, another one of the multiple adhesives used to couple the second substrate 130 to the third substrate 138 can provide improved adhesion between the second substrate 130 and the third substrate 138.

Figure 2:
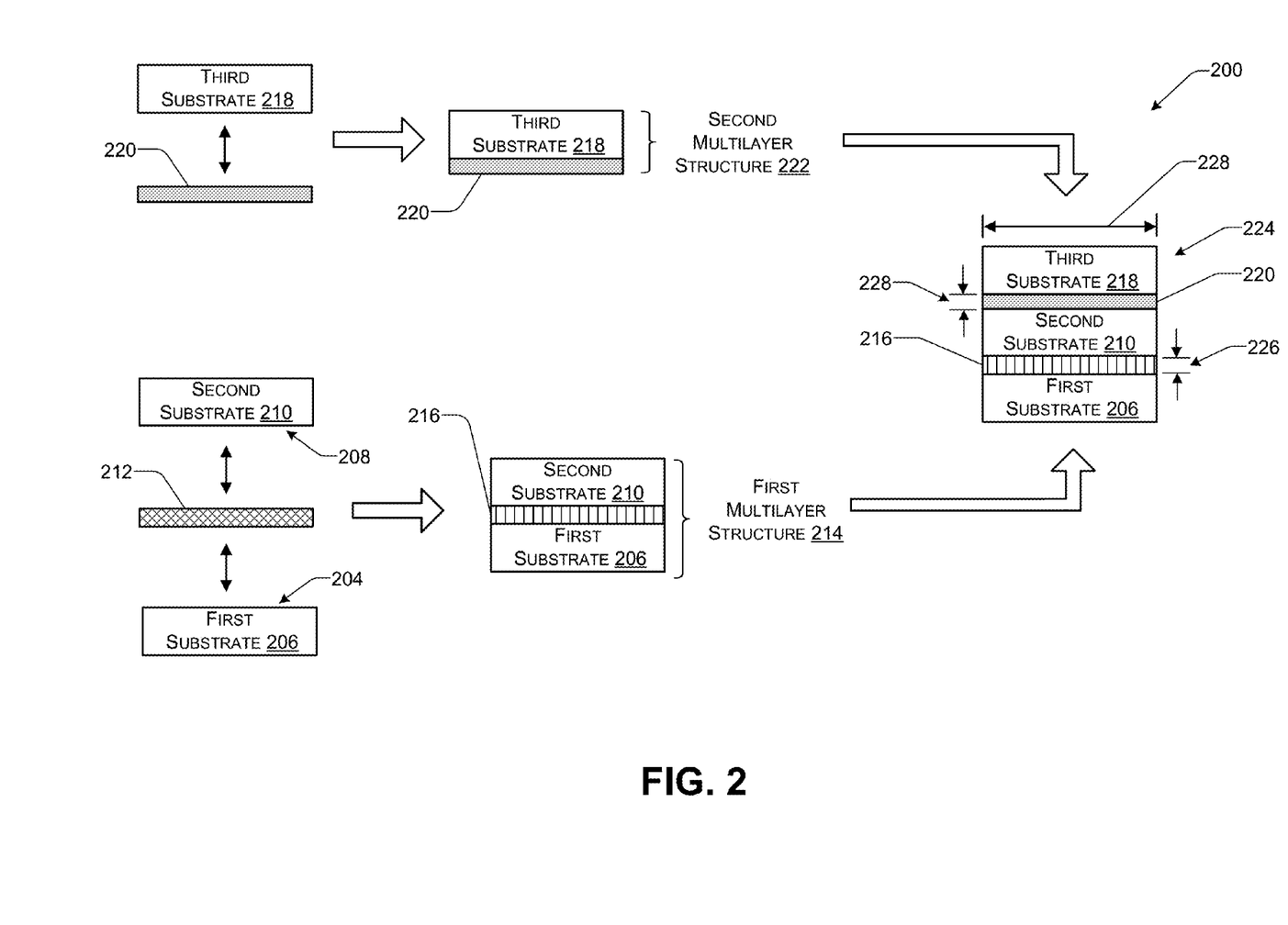
FIG. 2 illustrates an example process to produce a display stack by at least partially curing an adhesive coupling a first substrate to a second substrate and then coupling a third substrate to the second substrate using a second adhesive.

FIG. 2 illustrates an example process 200 to form a display stack 202 by at least partially curing an adhesive coupling a first substrate to a second substrate and then coupling a third substrate to the second substrate using a second adhesive. In an implementation, the process 200 includes contacting a surface 204 of a first substrate 206, a surface 208 of a second substrate 210, or both with a first adhesive 212. For example, the surface 204 of the first substrate 206 and/or the surface 208 of the second substrate 210 can be contacted by a LOCA. In some cases, the first adhesive 212 can be applied to one or more of the surface 204 or the surface 208 using a printing process, such as a screen printing process or a stencil printing process. In other situations, the first adhesive 212 can be applied to one or more of the surface 204 or the surface 208 by dispensing an amount of the first adhesive 212 onto the surface 204 and/or the surface 208 and allowing the amount of the first adhesive 212 to spread over the surface 204 and/or the surface 208. In additional implementations, the first adhesive 212 can be applied to one or more of the surface 204 or the surface 208 using a coating process, such as a die coating process. The surface 204, the surface 208, or both can be contacted with the first adhesive 212 at a temperature included in a range of about 10° C. to about 40° C. In another implementation, the surface 204, the surface 208, or both can be contacted with the first adhesive 212 at a temperature included in a range of about 18° C. to about 30° C.

In an implementation, the first adhesive 212 can have a viscosity of at least about 2000 cp, at least about 2500 cp, or at least about 3000 cp when contacted with the surface 204 and/or the surface 208. In another implementation, the LOCA can have a viscosity of no greater than about 5000 cp; no greater than about 4500 cp; or no greater than about 4000 cp when contacted with the surface 204 and/or the surface 208. In an illustrative implementation, the LOCA can have a viscosity included in a range of about 3250 cp to about 4750 cp. In another illustrative implementation, the LOCA can have a viscosity included in a range of about 3900 cp to about 4500 cp. In a particular implementation, the viscosity can be measured using a cone and plate viscometer at 20 revolutions per second.

In an implementation, after the first surface 204 and/or the second surface 208 are contacted with the first adhesive 212, the first substrate 206 and the second substrate 210 can be coupled together with the first adhesive 212 to form a first multilayer structure 214. In some cases, the first substrate 206 and the second substrate 210 can be coupled using a lamination process. In particular, a vacuum lamination process at a pressure included in a range of about 10 Pa to about 100 Pa can be used to couple the first substrate 206 with the second substrate 210.

After coupling the first substrate 206 with the second substrate 210, the first adhesive 212 can be at least partially cured to form a modified first adhesive 216. In an implementation, the first adhesive 212 can be cured by exposing the first adhesive 212 to heat. In another implementation, the first adhesive 212 can be cured by exposing the first adhesive 212 to moisture. In still other implementations, the first adhesive 212 can be cured by exposing the first adhesive 212 to UV radiation. In some cases, the first adhesive 212 can be cured by exposing the first adhesive 212 to one or more of heat, moisture, or UV radiation.

In a particular implementation, the first adhesive 212 can be cured to form the modified first adhesive 216 by exposing the first adhesive 212 to one or more cycles of UV radiation that have a particular duration. In some cases, when the first adhesive 212 is exposed to a plurality of cycles of UV radiation, one or more cycles of the plurality of cycles can have a different intensity than one or more additional cycles of the plurality of cycles. It should be noted that the values of the intensity and/or energy applied during the curing operations described herein refer to the intensity and/or energy supplied by the source of UV radiation.

In one example, a first cycle of the UV radiation applied to the first adhesive 212 can have an intensity of at least about 300 $mW/cm^2$, at least about 350 $mW/cm^2$, or at least about 400 $mW/cm^2$. In an implementation, the first cycle of UV radiation applied to the first adhesive 212 can have an intensity of no greater than about 550 $mW/cm^2$, no greater than about 500 $mW/cm^2$, or no greater than about 450 $mW/cm^2$. In an illustrative implementation, the first cycle of UV radiation applied to the first adhesive 212 can have an intensity included in a range of about 280 $mW/cm^2$ to about 580 $mW/cm^2$. In another illustrative implementation, the first cycle of UV radiation applied to the first adhesive 212 can have an intensity included in a range of about 390 $mW/cm^2$ to about 460 $mW/cm^2$.

In an implementation, a second cycle of UV radiation applied to the first adhesive 212 can have an intensity of at least about 800 $mW/cm^2$, at least about 850 $mW/cm^2$, or at least about 900 $mW/cm^2$. In other implementations, a second cycle of UV radiation applied to the first adhesive 212 can have an intensity of no greater than about 1100 $mW/cm^2$, no greater than about 1050 $mW/cm^2$, no greater than about 1000 $mW/cm^2$, or no greater than about 950 $mW/cm^2$. In an illustrative implementation, a second cycle of UV radiation applied to the first adhesive 212 can have an intensity included in a range of about 780 $mW/cm^2$ to about 1120 $mW/cm^2$. In another illustrative implementation, a second cycle of UV radiation applied to the first adhesive 212 can have an intensity included in a range of about 880 $mW/cm^2$ to about 970 $mW/cm^2$.

The first adhesive 212 can be exposed to one or more cycles of UV radiation for a particular duration. In some implementations, the first adhesive 212 can be exposed to UV radiation for at least about 2 seconds, at least about 20 seconds, at least about 50 seconds, or at least about 80 seconds. In additional implementations, the first adhesive 212 can be exposed to UV radiation for no greater than about 250 seconds, no greater than about 200 seconds, or no greater than about 150 seconds. In an illustrative implementation, the first adhesive 212 can be exposed to UV radiation for a duration included in a range of about 5 seconds to about 260 seconds. In other illustrative implementations, the first adhesive 212 can be exposed to UV radiation for a duration included in a range of about 80 seconds to about 140 seconds.

In an implementation, the first adhesive 212 can be at least partially cured by applying UV radiation in one or more first cycles, one or more second cycles, or both. In some implementations, the curing operations can include exposing the first adhesive 212 to UV radiation having a specified range of wavelengths. For example, a curing operation can be performed using UV radiation having wavelengths included in a range of 300 nm to 400 nm. In another example, a curing operation can be performed using UV radiation having wavelengths included in a range of 250 nm to 380 nm. The UV radiation applied during the curing operation can include UVA, UVB, UVC, UVV, or a combination thereof.

In one example, a first cycle of UV radiation can be applied to the first adhesive 212 followed by applying a second cycle of radiation to the first adhesive 212. In another example, a first cycle of UV radiation can be applied to the first adhesive 212 followed by applying a second cycle of radiation to the first adhesive 212 and subsequently applying an additional first cycle to the first adhesive. In an additional example, two first cycles of UV radiation can be applied to the first adhesive 212 followed by two second cycles of UV radiation. In various implementations, a period of time can elapse between applying cycles of UV radiation to the first adhesive 212. To illustrate, a period of time having a duration included in a range of 2 seconds to 30 seconds can elapse between applying cycles of radiation to the first adhesive 212. In other illustrative scenarios, a period of time having a duration included in a range of 5 to 15 seconds can elapse between applying cycles of radiation to the first adhesive 212. In some instances, warping of the first substrate 206 and/or the second substrate 210 can be minimized by pausing for a specified duration between applying cycles of radiation to the first adhesive 212.

The total energy per unit area applied to the first adhesive 212 in one or more first cycles of UV radiation can be at least about 5300 kJ/cm$^2$ for a surface area of the first adhesive 212, at least about 5800 kJ/cm$^2$ for a surface area of the first adhesive 212, or at least about 6300 kJ/cm$^2$ for a surface area of the first adhesive 212. In an implementation, the total energy per unit area applied to the first adhesive 212 in one or more first cycles of UV radiation can be no greater than about 8000 kJ/cm$^2$ for a surface area of the first adhesive 212, no greater than about 7500 kJ/cm$^2$ for a surface area of the first adhesive 212, or no greater than about 7000 kJ/cm$^2$ for a surface area of the first adhesive 212. In an illustrative implementation, the total energy per unit area applied to the first adhesive 212 in one or more first cycles of UV radiation can be included in a range of about 5000 kJ/cm$^2$ for a surface area of the first adhesive 212 to about 8200 kJ/cm$^2$ for a surface area of the first adhesive 212. In other illustrative implementations, the total energy per unit area applied to the first adhesive 212 in one or more first cycles of UV radiation can be included in a range of about 6200 kJ/cm$^2$ for a surface area of the first adhesive 212 to about 6800 kJ/cm$^2$ for a surface area of the first adhesive 212.

The total energy per unit area applied to the first adhesive 212 in one or more second cycles of UV radiation can be at least about 10,500 kJ/cm$^2$ for a surface area of the first adhesive 212, at least about 11,000 kJ/cm$^2$ for a surface area of the first adhesive 212, or at least about 11,500 kJ/cm$^2$ for a surface area of the first adhesive 212. In an implementation, the total energy per unit area applied to the first adhesive 212 in one or more second cycles of UV radiation can be no greater than about 13,500 kJ/cm$^2$ for a surface area of the first adhesive 212, no greater than about 13,000 kJ/cm$^2$ for a surface area of the first adhesive 212, or no greater than about 12,500 kJ/cm$^2$ for a surface area of the first adhesive 212. In an illustrative implementation, the total energy per unit area applied to the first adhesive 212 in one or more second cycles of UV radiation can be included in a range of about 10,000 kJ/cm$^2$ for a surface area of the first adhesive 212 to about 14,000 kJ/cm$^2$ for a surface area of the first adhesive 212. In other illustrative implementations, the total energy per unit area applied to the first adhesive 212 in one or more second cycles of UV radiation can be included in a range of about 11,750 kJ/cm$^2$ for a surface area of the first adhesive 212 to about 12,750 kJ/cm$^2$ for a surface area of the first adhesive 212.

In an implementation, UV radiation can be applied to the first adhesive 212 through the first substrate 206, the second substrate 210, or both. For example, during the curing process, UV radiation can be applied to at least 50% of the surface area of the first adhesive 212 contacting the surface 204, at least 60% of the surface area of the first adhesive 212 contacting the surface 204, at least 70% of the surface area of the first adhesive 212 contacting the surface 204, at least 80% of the surface area of the first adhesive 212 contacting the surface 204, or at least 90% of the surface area of the first adhesive 212 contacting the surface 204 can be exposed to UV radiation during the curing process. In another example, UV radiation can be applied to substantially all of the surface area of the first adhesive 212 contacting the surface 204 during the curing process. In an additional example, during the curing process, at least 50% of the surface area of the first adhesive 212 contacting the surface 208, at least 60% of the surface area of the first adhesive 212 contacting the surface 208, at least 70% of the surface area of the first adhesive 212 contacting the surface 208, at least 80% of the surface area of the first adhesive 212 contacting the surface 208, or at least 90% of the surface area of the first adhesive 212 contacting the surface 208 can be exposed to UV radiation during the curing process. In another example, UV radiation can be applied to substantially all of the surface area of the first adhesive 212 contacting the surface 208 during the curing process.

In various implementations, during the one or more curing operations, a surface of a substrate being exposed to the UV radiation can have a temperature of no greater than about 75° C., no greater than about 60° C., or no greater than about 50° C. In one example, when the first adhesive 212 is cured by exposing the first adhesive 212 to UV radiation through the second substrate 210, a temperature of the surface of the second substrate 210 can be included in a range of about 30° C. to about 60° C.

In some situations, one or more additional curing operations can be applied to the first adhesive 212. For example, a side curing operation can be applied to the first adhesive 212. The first adhesive 212 can also be further cured by exposing the first adhesive 212 to moisture and/or heat. In some cases, substantially all of the first adhesive 212 can be cured after applying one or more additional curing operations to the first adhesive 212.

Additionally, one or more additional operations can be performed in producing the first multilayer structure 214. To illustrate, one or more cleaning operations can be performed, such as one or more operations to clean the first substrate 206 and/or the second substrate 210 after performing a curing operation with respect to the first adhesive 212. In another illustrative example, a frame press operation can be performed on the first multilayer structure 214.

The process 200 can also include contacting a third substrate 218 with a second adhesive 220. In an implementation, the second adhesive 220 can include one or more of a film, gel, or tape that is applied to the third substrate 218. In some cases, the second adhesive 220 can be applied to the third substrate 218 using a roller process at a pressure included in a range of 50 kPa to 250 kPa. The third substrate 218 and the second adhesive 220 can be combined to form a second multilayer structure 220. In a particular implementation, the third substrate 218 can be subjected to a surface modification process to improve adhesion with the second adhesive 220. For example, a plasma treatment can be applied to the third substrate 218 to improve adhesion between the third substrate 218 and the second adhesive 220.

Although, the illustrative implementation of FIG. 2 shows that the third substrate 220 is coupled to a single layer of adhesive, the second adhesive 220, the third substrate 220 can also be coupled to an additional layer of adhesive. In one example, the additional layer of adhesive can include a material that blocks UV radiation from passing through the additional layer of adhesive. In an implementation, the second adhesive 220 and the additional layer of adhesive can be combined before contacting the second adhesive 220 or the additional layer of adhesive to the third substrate. For example, the second adhesive 220 and the additional layer of adhesive can be combined using a lamination process, such as a roll-to-roll lamination process performed at a temperature included in a range of about 15° C. to about 40° C. Additionally, the second adhesive 220 and the additional layer of adhesive can both include a film that can be cut before being contacted with each other. In illustrative implementations, the second adhesive 220 and the additional layer of adhesive can be cut using a mechanical punch process. In some scenarios, the second adhesive 220 and the additional layer of adhesive can be cut to have dimensions that correspond to dimensions of substrates of the display stack. To illustrate, the dimensions of the second adhesive 220 and the additional layer of adhesive can be cut to have dimensions that correspond to the dimensions of a display component of a display stack.

In an implementation, the first multilayer structure 214 and the second multilayer structure 222 can be combined to produce at least a portion of a display stack 224. In a particular implementation, the first multilayer structure 214 and the second multilayer structure 222 can be combined in a lamination process. In an illustrative implementation, the first multilayer structure 214 and the second multilayer structure 222 can be combined in a vacuum lamination process. For example, the second substrate 210 can be contacted with the third adhesive 220 at a pressure included in a range of about 10 Pa to about 300 Pa. In another example, the second substrate 210 can be contacted with the third adhesive 220 at a pressure included in a range of about 25 Pa to about 100 Pa. Additionally, the lamination process can be performed at a temperature included in a range of about 15° C. to about 30° C. Furthermore, in one implementation, the lamination process can have a duration included in a range of about 40 seconds to 120 seconds. In another implementation, the lamination process can have a duration included in a range of about 70 seconds to 90 seconds.

In some implementations, the display stack 224 can be produced using a module edge press operation at a pressure included in a range of about 100 MPa to about 300 MPa for a duration included in a range of about 5 seconds to about 40 seconds at a temperature included in a range of about 50° C. to about 75° C. The module edge press operation can be performed, in some cases, after the first multilayer structure 214 and the second multilayer structure 222 are combined in a lamination process.

In additional implementations, the display stack 224 can be produced by coupling the first multilayer structure 214 and the second multilayer structure 222 and then applying heat and an external force. In various implementations, the display stack 224 can be produced by coupling the first multilayer structure 214 and the second multilayer structure 222 and subsequently applying heat and the external force in a chamber. In an illustrative implementation, the heat and external force can be applied to produce the display stack 224 in an autoclave chamber. In some cases, the application of heat and the external force to produce the display stack 224 can take place after a vacuum lamination process combining the first multilayer structure 214 with the second multilayer structure. In one example implementation, the display stack 224 can be produced by heating the first multilayer structure 214 and the second multilayer structure at a temperature included in a range of about 25° C. to about 80° C. In another example implementation, the display stack 224 can be produced by heating the first multilayer structure 214 and the second multilayer structure 222 at a temperature included in a range of about 40° C. to about 60° C.

Additionally, the display stack 224 can be produced by applying an external force to the one or more of the first substrate 206 or the third substrate 218. In a particular implementation, the display stack 224 can be coupled between a first fixture of an apparatus and a second fixture of an apparatus. For example, the display stack 224 can be placed in an apparatus such that the first fixture of the apparatus can be lowered to contact a top surface of the third substrate 218 and the bottom surface of the first substrate 206 can be placed onto the second fixture of the apparatus. The external force applied to produce the display stack 224 can be included in a range of about 0.5 kgf to about 12 kgf. In other implementations, the external force applied to produce the display stack 224 can be included in a range of about 4 kgf to about 8 kgf. In a particular implementation, the apparatus can include a press, such as a vacuum press, a lamination press, or a combination thereof.

In an implementation, the external force can be applied to produce the display stack 224 while heat is also applied to the display stack 224. In some situations, the heat and/or external force can be applied to produce the display stack 224 for a duration included in a range of about 5 minutes to about 45 minutes. In other situations, the heat and/or external force can be applied to produce the display stack 224 for a duration included in a range of about 10 minutes to about 20 minutes.

In an implementation, the modified first adhesive 216 can have a first thickness 226. In a particular implementation, the first thickness 226 can be at least about 100 micrometers, at least about 130 micrometers, or at least about 160 micrometers. In another implementation, the first thickness 226 can be no greater than about 230 micrometers, no greater than about 210 micrometers, or no greater than about 190 micrometers. In an illustrative implementation, the first thickness 226 can be included in a range of about 80 micrometers to about 250 micrometers. In an additional illustrative implementation, the first thickness 226 can be included in a range of about 145 micrometers to about 185 micrometers.

Additionally, the second adhesive 220 can have a second thickness 228. In some implementations, the second thickness 226 can be no greater than about 100 micrometers, no greater than about 80 micrometers, or no greater than about 60 micrometers. In an illustrative implementation, the second thickness 228 can be included in a range of about 8 micrometers to about 110 micrometers. In an additional illustrative implementation, the second thickness 228 can be included in a range of about 20 micrometers to about 55 micrometers. In other illustrative implementations the second thickness 228 can be included in a range of about 15 micrometers to about 75 micrometers. In implementations where multiple adhesives are used to couple the second substrate 210 with the third substrate 218, a first portion of the thickness 228 can include a thickness of one of the adhesives, while a second portion of the thickness 228 can include a thickness of another one of the adhesives. For example, one adhesive coupling the second substrate 210 with the third substrate 218 can have a thickness included in a range of about 50 micrometers to about 200 micrometers and another adhesive coupling the second substrate 210 with the third substrate 218 can have a thickness included in a range of about 10 micrometers to about 125 micrometers.

One or more layers of the display stack 224 can also have a width 228 that is included in a range of about 1 cm to about 25 cm. In other situations, the width 228 can be included in a range of about 4 cm to about 15 cm. In some cases, the layers of the display stack 224 can have substantially the same width. In additional implementations, the one or more of the layers of the display stack 224 can have a width that is different from one or more additional layers of the display stack 224. For example, the second substrate 210 can have a width that is different from the width of the first substrate 206 and/or the third substrate 218.

Although not shown in the illustrative example of FIG. 2, the layers of the display stack 224 can also have a length that is measured perpendicular to the width 228. In an implementation, the length can be included in a range of about 2 cm to about 30 cm. In another implementation, the length can be included in a range of about 7 cm to about 20 cm.

In a particular illustrative implementation, the first substrate 206 can include a display component to display content. The display component can be formed by coating e-ink onto a file, such as via a roll-to-roll process. Additionally, the second substrate 210 can include a front light component having a light guide and a front light source. The light guide can include material having etchings, gratings, or other patterns formed thereon for directing light from the front light source to illuminate a display component of the display stack 224. Furthermore, the third substrate 218 can include a cover layer component having one or more layers with antiglare properties, antireflective properties, anti-smudge properties, crack-resistant properties, scratch-resistant properties, a specified hardness, or combinations thereof. In some implementations, a touch sensor portion can be coupled to or integrated with the cover layer component. The touch sensor portion can detect user input via an input device (e.g., a finger, a stylus, etc.). In an implementation, the touch sensor portion can include one or more layers of electrodes formed on the cover layer component.

In some implementations, the display stack 224 can include one or more additional layers. For example, the display stack 224 can include a front plane laminate layer and a thin film transistor layer as part of a display component of the display stack 224. Additionally, the display stack 224 can include one or more protective layers placed between one or more layers of the display stack 224. In some cases, the display stack 224 can also include a flexible printed circuit layer coupled to an electronic paper display of a display component of the display stack 224. Further, the display stack 224 can also include a UV filtering layer to block UV radiation from passing through the UV filtering layer.

Figure 3:
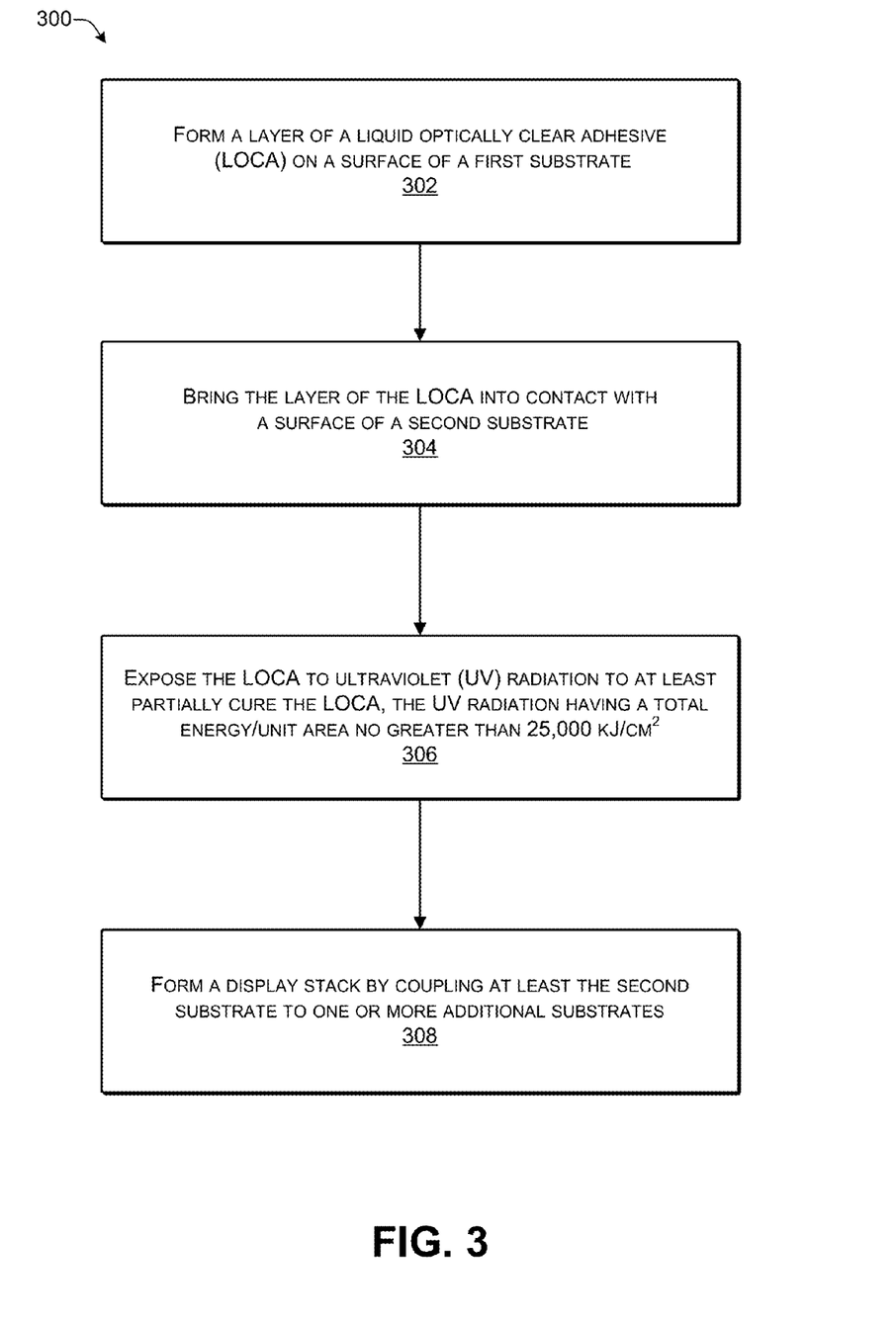
FIG. 3 illustrates a flow diagram of an example process to produce a display stack by partially curing a first adhesive coupling a first substrate with a second substrate before coupling a third substrate to the second substrate with a second adhesive.

FIG. 3 illustrates a flow diagram of an example process 300 to produce a display stack by partially curing a first adhesive coupling a first substrate with a second substrate before coupling a third substrate to the second substrate with a second adhesive. In some implementations, the display stack can include the display stack 102 of FIG. 1 and/or the display stack 224 of FIG. 2. The order in which the operations are described is not intended to be construed as a limitation, and any number of the described operations can be combined in any order and/or in parallel to implement the process.

At 302, the process 300 includes forming a layer of a liquid optically clear adhesive (LOCA) on a surface of a first substrate. In an implementation, the first substrate can include a display component of the display stack and a second substrate can include a front light component of the display stack. In some instances, the front light component can include a light guide and a light source. In various implementation, the layer of the LOCA can be formed on at least a portion of the light guide, at least a portion of the light source, or on both at least a portion of the light guide and at least a portion of the light source. In a particular implementation, the LOCA can be applied to a surface of the first substrate and/or a surface of the second substrate using a printing process. At 304, the process 300 includes bringing the layer of the LOCA into contact with a surface of the second substrate.

At 306, the process 300 includes exposing the LOCA to ultraviolet (UV) radiation to at least partially cure the LOCA. In an implementation, the UV radiation can have a total energy/unit area of no greater than 25,000 $kJ/cm^2$ for a surface area of the LOCA. In other implementations, the UV radiation can have a total energy/unit area included in a range of about 10,000 $kJ/cm^2$ for a surface area of the LOCA to about 50,000 $kJ/cm^2$ for a surface area of the layer of the LOCA. In a particular implementation, the UV radiation can have a total energy/unit area of at least about 10,000 $kJ/cm^2$ for a surface area of the LOCA, at least about 15,000 $kJ/cm^2$ for a surface area of the LOCA, or at least about 20,000 $kJ/cm^2$ for a surface area of the LOCA. In another implementation, the UV radiation can have a total energy/unit area no greater than about 50,000 $kJ/cm^2$ for a surface area of the LOCA, no greater than about 45,000 $kJ/cm^2$ for a surface area of the LOCA, no greater than about 40,000 $kJ/cm^2$ for a surface area of the LOCA, or no greater than about 35,000 $kJ/cm^2$ for a surface area of the LOCA. In an illustrative implementation, the UV radiation can have a total energy/unit area included in a range of about 15,000 $kJ/cm^2$ for a surface area of the LOCA to about 25,000 $kJ/cm^2$ for a surface area of the layer of the LOCA.

In some cases, the UV radiation can be applied to the LOCA in a plurality of cycles. Each cycle can have a respective duration, such as at least 10 seconds, at least 20 seconds, at least 30 seconds, or at least 40 seconds. Additionally, each cycle of the plurality of cycles can have a duration of no greater than 150 seconds, no greater than 120 seconds, no greater than 90 seconds, or no greater than 60 seconds. In an illustrative implementation, the duration of a respective cycle of the plurality of cycles can be between 10 seconds and 200 seconds. In another illustrative implementation, the duration of a respective cycle of the plurality of cycles can be between 30 seconds and 90 seconds.

In an implementation, a first cycle of the plurality of cycles is performed at an intensity included in a range of about 280 mW/cm² for the surface area of the LOCA to about 580 mW/cm² for the surface area of the LOCA and a second cycle of the plurality of cycles is performed at an intensity included in a range of about 780 mW/cm² for a surface area of the LOCA to about 1120 mW/cm² for a surface area of the LOCA. Additionally, the UV radiation can be applied to the LOCA using a plurality of first cycles to the LOCA and/or applying a plurality of second cycles. In an implementation, a pause for a time period can be taken between one or more cycles of the plurality of cycles. The pause can have a duration included in a range of about 2 seconds to about 30 seconds.

At 308, the process can include forming a display stack by coupling at least the second substrate to one or more additional substrates. In various implementations, the one or more additional substrates can be coupled to the first substrate, the second substrate, or both. For example, a third substrate can be coupled to the second substrate by applying at least one optically clear adhesive (OCA) to the third substrate. In an implementation, multiple OCAs can be used to couple the second substrate with the third substrate. In particular, a first OCA can be coupled to a second OCA with the first OCA contacting the third substrate and the second OCA contacting an additional surface of the second substrate. In an illustrative implementation, the first OCA can include a silicone-based OCA and the second OCA can include an acrylic-based OCA. In some situations, the third substrate can be subjected to a surface modification process, such as plasma treatment, before being contacted with the at least one OCA.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    forming a layer of a liquid optically clear adhesive (LOCA) on a surface of a first substrate, the first substrate including a display component;
    bringing the layer of the LOCA into contact with a surface of a second substrate;
    exposing the LOCA to ultraviolet (UV) radiation to at least partially cure the LOCA, wherein the UV radiation has a total energy/unit area in a range of about 10,000 kJ/cm² to about 50,000 kJ/cm²; and
    forming a display stack by coupling at least the second substrate to one or more additional substrates.

2. The method of claim 1, wherein exposing the LOCA to the UV radiation includes exposing the LOCA to the UV radiation during each of a plurality of cycles, each cycle of the plurality of cycles having a respective duration.

3. The method of claim 2, wherein a first cycle of the plurality of cycles is performed at an intensity of the UV radiation between 280 mW/cm² for and 580 mW/cm² and a second cycle of the plurality of cycles is performed at an intensity of the UV radiation between 780 mW/cm² and 1120 mW/cm².

4. The method of claim 3, wherein exposing the LOCA to the UV radiation includes one of:
    applying a plurality of first cycles to the LOCA; or
    applying a plurality of second cycles to the LOCA; or
    applying a plurality of the first cycles and a plurality of the second cycles to the LOCA.

5. The method of claim 2, wherein a time period between one or more cycles of the plurality of cycles has a duration between 2 seconds and 30 seconds.

6. The method of claim 1, wherein forming the display stack includes:
    coupling a first OCA to a second OCA, wherein the first OCA includes a silicone-based material and the second OCA includes an acrylic-based material;
    contacting the first OCA with a third substrate; and
    contacting the second OCA with an additional surface of the second substrate.

7. The method of claim 6, further comprising applying a surface modification process to the third substrate before contacting the first OCA with the third substrate.

8. The method of claim 6, wherein the third substrate includes a cover component including a touch sensor component, wherein the touch sensor component is in contact with the first OCA.

9. The method of claim 1, further comprising exposing the LOCA to the UV radiation for a duration between 10 seconds and 150 seconds.

10. The method of claim 1, wherein the at least the second substrate is coupled to the one or more additional substrates via a lamination process at a pressure between 10 Pa and 300 Pa.

11. The method of claim 1, wherein the second substrate includes a front light component of the display stack, the front light component including a light guide and a light source.

12. A process comprising:
    coupling a front light component of a display stack to a display component of the display stack with a photo-curable adhesive, the photo-curable adhesive being partially cured such that at least 50% of the photo-curable adhesive is cured;
    coupling an additional substrate to the front light component after coupling the front light component to the display component; and
    applying one or more of heat, moisture, or ultraviolet (UV) radiation to further cure the photo-curable adhesive.

13. The process of claim 12, wherein the photo-curable adhesive is a gel that is curable using UV radiation.

14. The process of claim 12, further comprising applying the photo-curable adhesive to one or more of a surface of the display component or a surface of the front light component, wherein the photo-curable adhesive is a liquid optically clear adhesive (LOCA) having a viscosity included in a range of about 3900 centipoise (cp) to about 4500 cp.

15. The process of claim 12, wherein the additional substrate is coupled to the front light component with one or more optically clear adhesives, the one or more optically clear adhesives having a refractive index between 1.38 and 1.53.

16. The process of claim 12, wherein the additional substrate includes a touch sensor component integrated with a cover layer component.

17. A process comprising:
    applying a liquid optically clear adhesive (LOCA) to at least a portion of a first surface of a front light component, the LOCA having a first refractive index that is lower than a second refractive index of a light guide portion of the front light component;
    bringing a surface of a display component into contact with the at least the portion of the first surface of the front light component using the LOCA to produce a first multilayer structure;

exposing at least about 50% of the surface area of the LOCA to ultraviolet (UV) radiation for a duration to partially cure the LOCA;

applying an optically clear adhesive (OCA) tape to a cover glass component to form a second multilayer structure; and laminating the first multilayer structure to the second multilayer structure using at least the OCA tape to produce a display stack.

18. The process of claim 17, wherein exposing the LOCA to the UV radiation includes exposing the LOCA to a first cycle of UV radiation, the UV radiation for the first cycle having an intensity ranging between 390 mW/cm$^2$ and 460 mW/cm$^2$; and the process further includes exposing the LOCA to a second cycle of UV radiation to further cure the LOCA, the UV radiation for the second cycle having an intensity ranging between 880 mW/cm$^2$ and 970 mW/cm$^2$.

19. The process of claim 17, wherein:

the OCA tape is a first OCA tape including an additive to block UV radiation from passing through the first OCA tape;

the second multilayer structure further includes a second OCA tape; and the first OCA tape is disposed between the second OCA tape and the cover glass component.

20. The process of claim 17, further comprising:

heating the display stack in a chamber at a temperature of between 25° C. and 80° C. for between 10 minutes to 20 minutes;

placing the display stack between a first fixture of an apparatus included in the chamber and a second fixture of the apparatus; and applying a force to the display stack in the chamber by bringing the first fixture and the second fixture into contact with the display stack, wherein a value of the force is between 4 kgf to 8 kgf.

\* \* \* \* \*